April 7, 1964   G. L. GRANT ETAL   3,128,038
FARE COLLECTING MACHINE
Filed Oct. 18, 1960   7 Sheets-Sheet 1
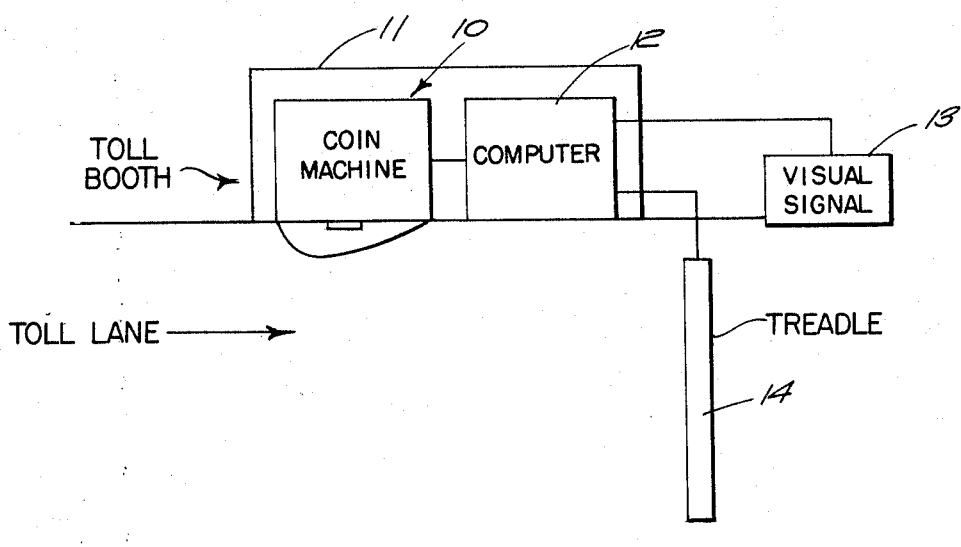
FIG. 1
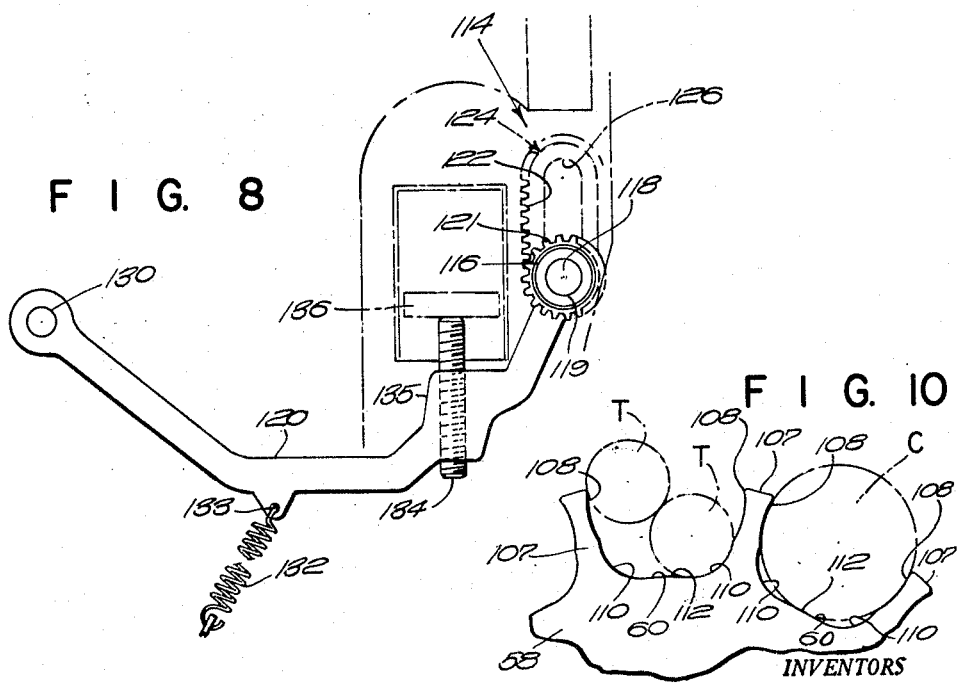
FIG. 8
FIG. 10
INVENTORS
GARDNER L. GRANT
WALTER ANTONOFF
BY EMILE G. GAUTHIER
HOWARD A. POWERS
*Salter + Michaelson*
ATTORNEYS April 7, 1964

G. L. GRANT ETAL 3,128,038

FARE COLLECTING MACHINE

Filed Oct. 18, 1960

*INVENTOR.*
GARDNER L. GRANT
WALTER ANTONOFF
BY EMILE G. GAUTHIER
HOWARD A. POWERS

*Salter + Michaelen*

ATTORNEYS

April 7, 1964

G. L. GRANT ETAL 3,128,038

FARE COLLECTING MACHINE

Filed Oct. 18, 1960

INVENTORS
GARDNER L. GRANT
WALTER ANTONOFF
BY EMILE G. GAUTHIER
HOWARD A. POWERS

*Salter + Michaelson*

ATTORNEYS

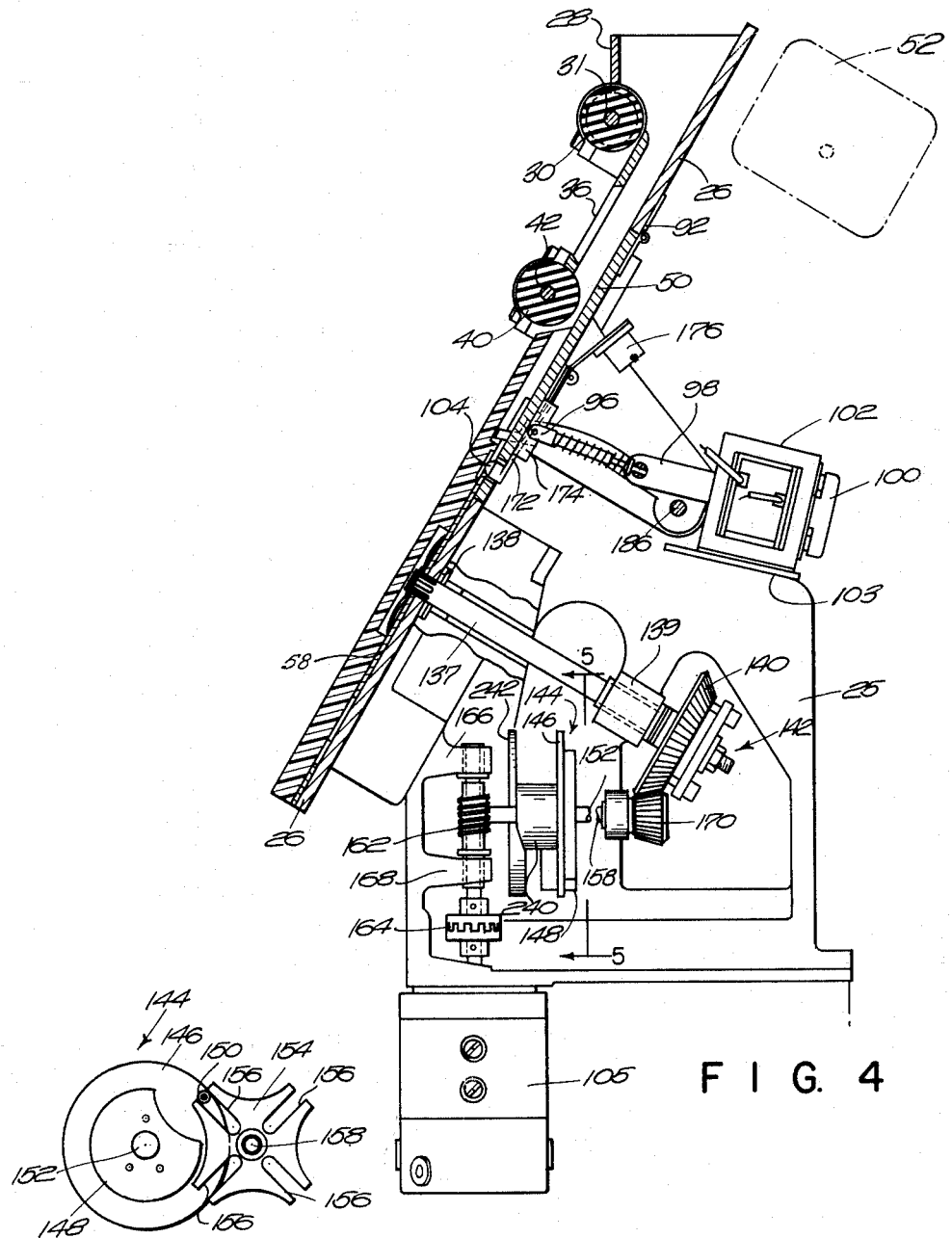

April 7, 1964

G. L. GRANT ETAL 3,128,038

FARE COLLECTING MACHINE

Filed Oct. 18, 1960

INVENTORS
GARDNER L. GRANT
WALTER ANTONOFF
EMILE G. GAUTHIER
HOWARD A. POWERS

BY *Salter + Michaelson*

ATTORNEYS

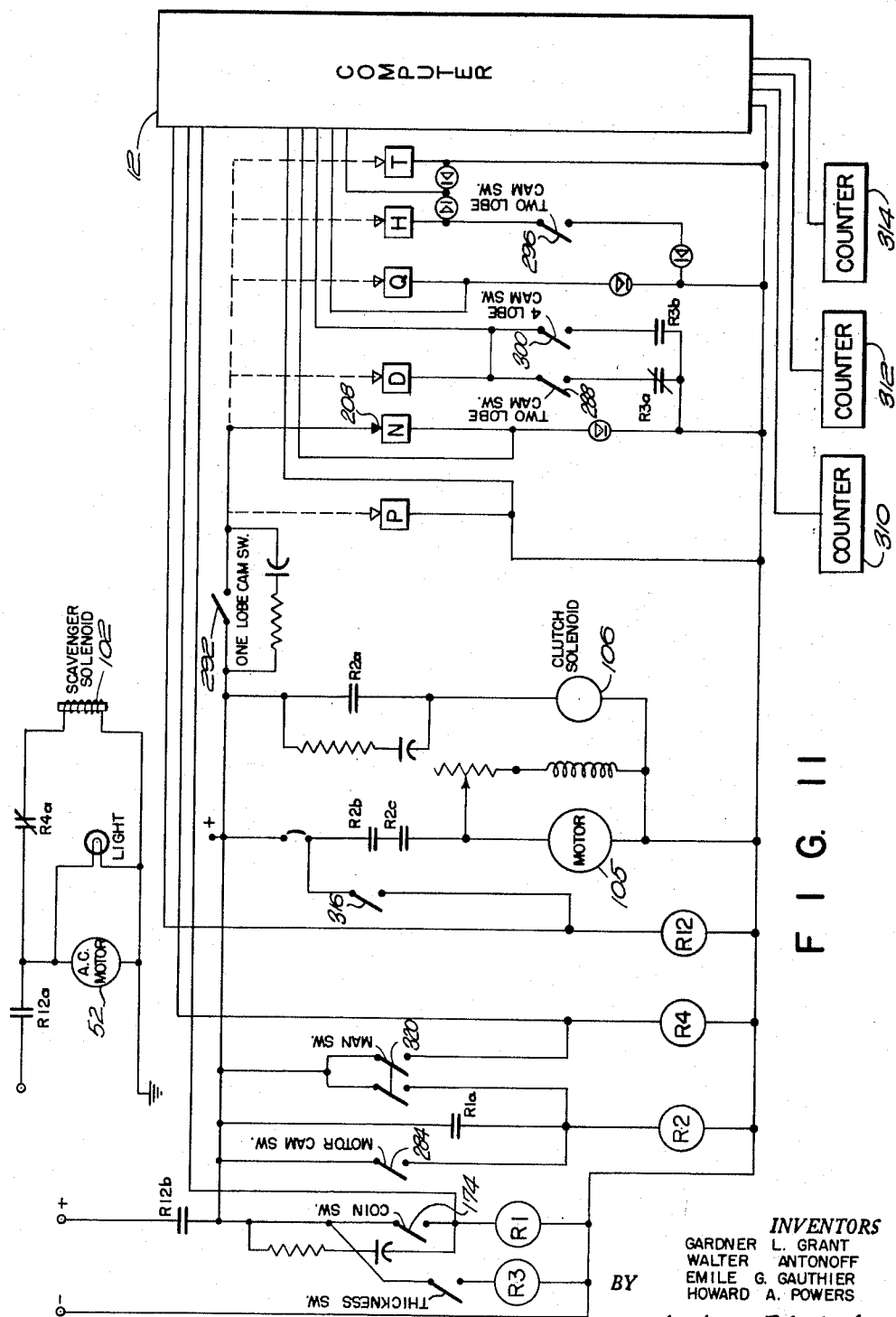
FIG. II
INVENTORS
GARDNER L. GRANT
WALTER ANTONOFF
EMILE G. GAUTHIER
HOWARD A. POWERS
BY Salter & Michaelson
ATTORNEYS

# United States Patent Office 3,128,038
Patented Apr. 7, 1964

3,128,038
FARE COLLECTING MACHINE
Gardner L. Grant, Providence, Walter Antonoff, Coventry, and Emile Gauthier, Pawtucket, R.I., and Howard A. Powers, Medfield, Mass., assignors to Universal Controls, Inc., New York, N.Y., a corporation of Maryland
Filed Oct. 18, 1960, Ser. No. 63,334
8 Claims. (Cl. 235—32)

The present invention relates to fare collecting apparatus. More particularly, the present invention relates to a coin collecting and registering device and has particular application in controlling passage of vehicular traffic through toll stations located on bridges, superhighways and the like. In connection with the present invention, reference is made to the copending application of Powers et al., Serial No. 55,256, filed September 12, 1960, entitled Fare Collecting Apparatus and the patent to Miller No. 2,848,158, both of which disclose fare collecting devices generally similar to the apparatus embodied herein.

The fare collecting machine embodied herein is adapted to accept coins of various denominations and is electrically connected to a computer that automatically counts and registers the amount of the coins deposited. When the coins received by the machine aggregate a predetermined amount, the computer will indicate a fare-paid and will control a light signal or similar device to indicate to the passenger that passage through the toll station is permitted.

In order to count and register the amount of the coins deposited in the fare collecting machine, the present invention employs a diameter gauging assembly similar to that described in the aforementioned patent to Miller, No. 2,848,158 and copending application to Powers et al. Although the diameter gauging assembly embodied herein is adapted to detect the denomination of the coins deposited in the machine by measuring the diameter thereof, it has been found that on occasion two coins, such as two dimes, may be deposited in a single pocket of the rotor that indexes the coins to the diameter gauging station. Heretofore it was not possible to detect the presence of two dimes that were indexed simultaneously to the gauging station since the diameters of each of the dimes corresponded to a coin that was accepted by the machine. In order to detect the presence of two dimes located in a single rotor pocket, the present invention utilizes a measuring device that measures the thickness of coins located at the gauging station. The thickness measuring device further cooperates with the diameter gauging assembly to detect the amount of the coins being gauged at the gauging station.

In order to transfer the information detected at the gauging station to a computer, a plurality of switches are provided and are located in circuit with segment contacts. Each of the segment contacts corresponds to a particular coin and upon engagement therewith by a contact movable with the gauging assembly, a circuit to a corresponding switch is completed. Upon closing of the switches in a predetermined timed relation, a pulse is produced that corresponds to the denomination of the coins located at the gauging station, the pulse being fed to the computer for the counting and registering thereof.

The present invention also incorporates a novel coin feeding device that is adapted to orient the coins or fare parts as they are deposited into the machine and prior to their entry into the rotor pockets. The coin feeding device includes a pair of spaced rollers that are positioned above the rotor and are continuously driven by a drive means that is independent of the drive means for the rotor. The rollers are also spaced from the face plate of the machine so that as the coins fall therebetween and the face plate, they will be oriented with respect to the pockets of the rotors into which they gravitate. A coin guard is further located adjacent the rotor and is adapted to be movable in a vertical direction in response to the engagement thereof by a large coin, such as a quarter or half-dollar, as it moves to the gauging station. The coin guard is adapted to pre-lift a diameter-gauging blade located at the gauging station and further acts to prevent two small coins from lodging in a rotor pocket prior to the indexing of the rotor to the gauging station. Thus the coin guard will tend to remove one of the coins from the rotor pocket so that only a single coin will be indexed to the gauging station.

The present invention also includes a unique design for the peripheral pockets of the rotor, wherein the opposed sides of the pockets are formed in a double concave configuration, the outermost opposed concavities having the radius of the largest coin to be accepted by the machine and the innermost opposed concavities having the radius of the smallest coin to be accepted by the machine. This special configuration of the rotor pockets aids in preventing jamming of the smaller coins therein and cooperates with the coin guard construction to return a jammed coin to the next approaching pocket prior to the indexing of the coins to the gauging station.

The present invention further utilizes an electrical counting system that is similar to that described in the aforesaid copending application to Powers et al. As described in the copending application, the counting system is adapted to count the number of pulses that result from a coin being gauged at the gauging station. If, for example, the counting system is arranged so as to count each nickel deposited in the machine as one pulse, then electrical counters connected in circuit to the counting system will register the amount of the fare deposited in accordance with the number of pulses produced. As indicated above, the pulses are generated as a result of the diameter gauging assembly positioning a gauging arm contact in engagement with one of several selector plate contacts located on a selector plate assembly. Cams associated with the drive shaft of the coin machine are adapted to close switches that are located in circuit with the selector plate contacts and upon the gauging of the diameter of the coin located at the gauging station, a circuit will be established through one of the contacts and its associated switch to produce the required pulse for registering the amount of the coin at the gauging station. If the coin collecting apparatus is utilized at a toll collecting station, a visual signal may be actuated when a fare-paid is counted by the computer to indicate to the patron that passage through the toll station is permitted.

Accordingly, it is an object of the present invention to provide a toll collecting device for use at a toll station that is adapted to receive multiple coin fares therein and that includes means for detecting and registering the deposited fares.

Another object of the invention is to provide a fare collecting device for use at a toll station that is adapted to facilitate rapid transfer of passengers through the station.

Still another object is to provide a fare collecting device wherein multiple fares may be deposited therein, the device being adapted to receive and register only coins of standard denomination whereby access through a toll station may be effectively controlled.

Still another object is to provide diameter gauging means for use in a coin machine that cooperates with a selector plate assembly to produce a pulse or series of pulses for indicating a preselected amount of fare, thereby producing a signal that indicates passage through a barrier, such as a toll station.

Still another object is to provide a coin guide assembly for use in a fare collecting device that includes a pair of spaced rollers that are independently driven and that are adapted to orient the fare parts or coins after they have been deposited in the coin inlet of the machine.

Still another object is to provide a device for detecting the thickness of coins or fare parts that are indexed to the gauging station, the thickness measuring device being adapted to detect the presence of coins that have a thickness greater than a predetermined thickness.

Still another object is to provide a device for use in gauging coins in a coin machine wherein the presence of two coins, such as two dimes, that are located in face-to-face relation in one of the rotor pockets of the machine and that are indexed to the gauging station of the machine will be detected and recorded.

Still another object is to provide a coin guard for use in a coin machine that is responsive to engagement of larger coins to prelift the gauging blade of the coin gauging assembly as the coin to be gauged is indexed to the gauging station.

Still another object is to provide a coin guard for use in a coin collecting machine that is adapted to prevent jamming of the coins in the pockets of the coin machine rotor.

Still another object is to provide a rotor for use in a coin machine which includes preformed pockets that are shaped to prevent the jamming of coins therein that are fed thereto from the coin inlet of the machine.

Other objects, features and advantages of the invention will become apparent as the description thereof proceeds when considered in connection with the accompanying illustrative drawings.

In the drawings which illustrate the best mode presently contemplated by us for carrying out the instant invention:

FIG. 1 is a diagrammatic illustration of the fare collecting or coin machine embodied herein as it is employed at a toll station;

FIG. 4 is a view taken along lines 4—4 in FIG. 2;

FIG. 5 is a sectional view taken along lines 5—5 in FIG. 4;

FIG. 8 is an enlarged front elevational view of the coin guard assembly, the link for actuating the coin guard roller being shown in full lines;

FIG. 10 is an enlarged view of a portion of the rotor showing the configuration of the pockets formed therein; and FIG. 11 is a diagrammatic illustration of the electrical circuit that controls the operation of the apparatus embodied herein.

Figure 2:
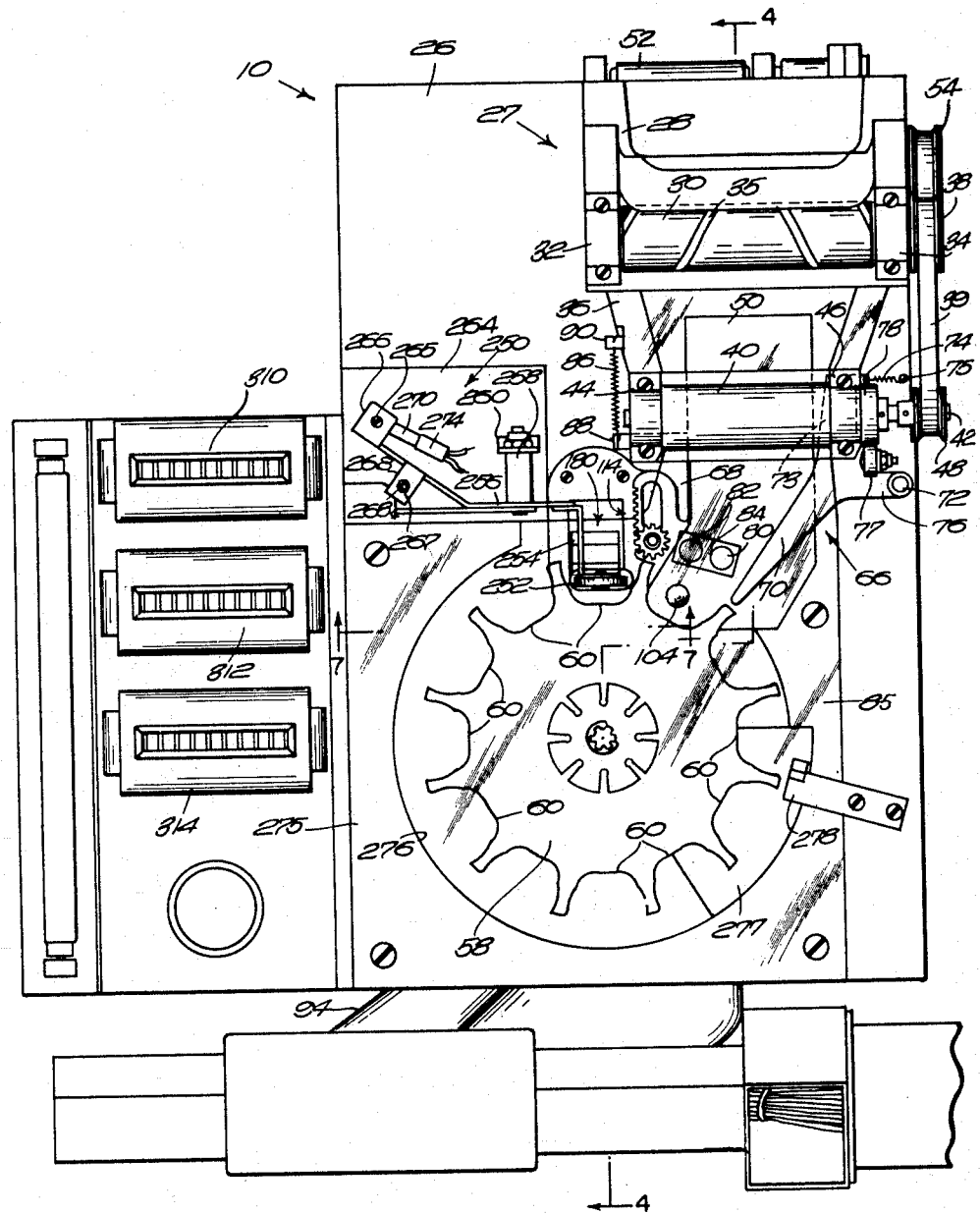
FIG. 2 is a front elevational view of the coin machine embodied in the present invention.

Referring now to the drawings and more particularly to FIG. 1, a coin machine generally indicated at 10 is shown installed in a housing or toll booth 11 adjacent a toll lane such as that found on a superhighway. A computer 12 is located in the housing 11 and is electrically connected to the coin machine 10, the computer 12 being responsive to the operation of the coin machine 10 for controlling a visual signal indicated at 13. A ground positioned treadle 14 is also electrically connected to the computer 12 and is responsive to the passage of vehicle thereover to cause the computer to reset the visual signal as is well known in the art. As will be more fully described hereinafter, upon the deposit of coins in the coin machine 10 aggregating a predetermined fare, the coin machine 10 will feed an electrical pulse into the computer 12 for counting and registering the fare. When the computer has counted the deposited coins to indicate a fare paid, the visual signal will be actuated to indicate to the motorist that passage through the toll lane is permitted. If the coins deposited do not constitute a fare-paid or if any of the coins are unacceptable, the coin machine 10 will fail to feed the necessary pulses into the computer 12 and the visual signal will fail to indicate passage through the toll lane.

Figure 3:
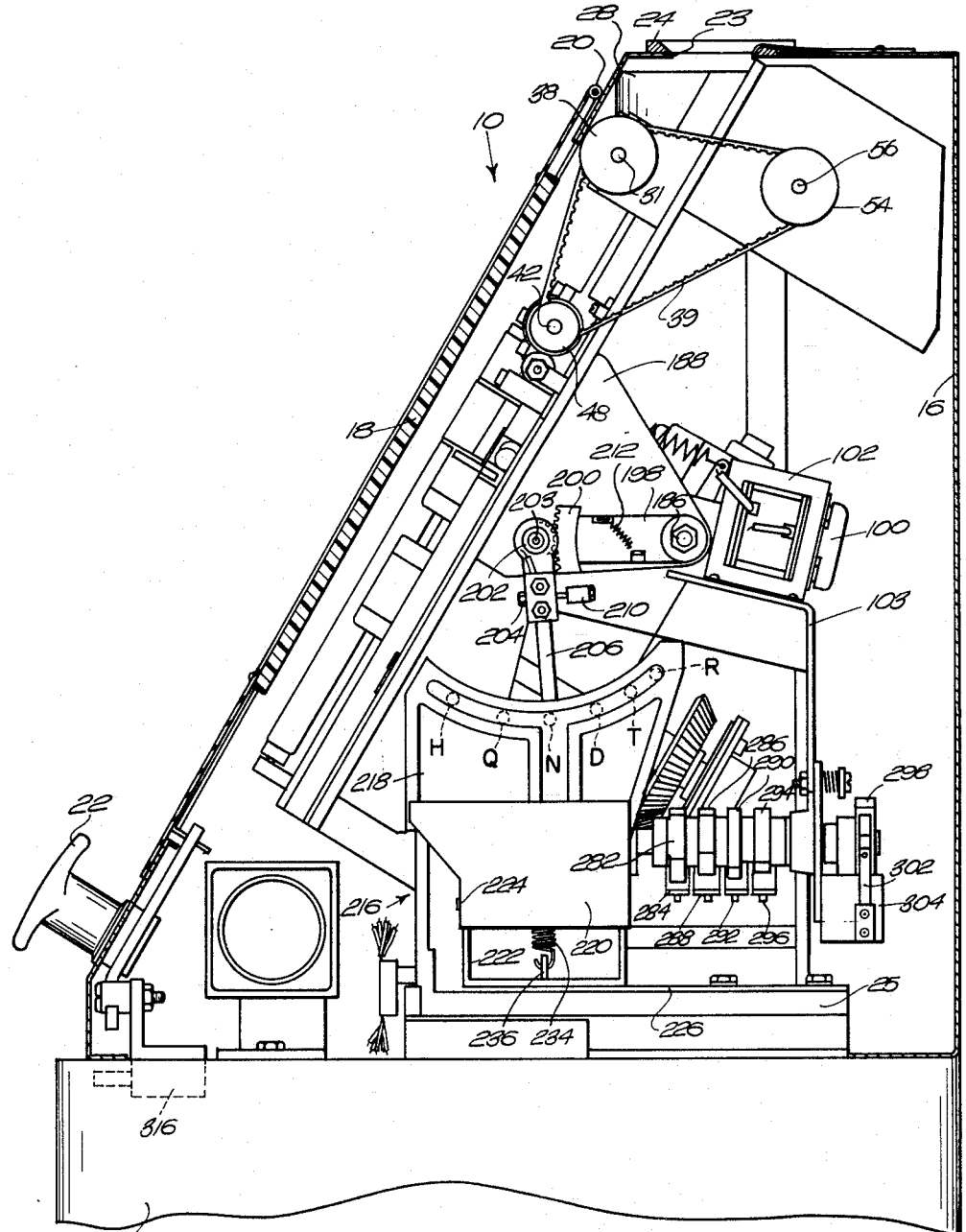
FIG. 3 is a side elevational view of the coin machine illustrated in FIG. 2.

Referring now to FIGS. 2 through 9, the coin machine 10 is illustrated in detail and includes a base 15 on which a housing 16 is mounted. The base 15 is hollow and is adapted to receive a cash vault (not shown) into which the coins that have been counted and registered by the coin machine are directed. The housing 16 includes an inclined glass cover 18 that is hingedly mounted at 20 and is locked in position by a handle 22 (FIG. 3). Formed in the top wall of the housing 16 is an opening 23 over which a casting 24 having a central opening formed therein is secured. Extending through the opening in the casting and communicating with the opening 23 is the bottom-most end of a hopper (not shown) into which the passing motorists deposit their fares.

Mounted on the base 15 and disposed within the housing 16 is a frame construction indicated at 25 that is cast as an integral unit and on which the component parts of the coin machine are adapted to be mounted. Secured to the forward portion of the frame 25 is a face plate 26 that is inclined with respect to the horizontal, the face plate 26 underlying the glass cover 18 and being visible therethrough. Mounted on the upper portion of the face plate 26 and positioned directly beneath the opening 23 is a fare guide assembly generally indicated at 27. The fare guide assembly 27 includes an upper guide chute 28 that communicates with the opening 23, the coins gravitating into the upper guide chute 28 after they pass through the opening 23. Mounted on the upper guide chute 28 is an upper coin feed roller 30 that is secured to a shaft 31 that is, in turn, journalled for rotation in spaced bearings 32 and 34, the bearings 32, 34 being secured to the coin guide chute 28. The feed roller 30 is preferably formed of a rubber material and has a spiral or helical groove 35 formed in the periphery thereof that is adapted to turn the coins from an edge position to a flat position upon contact therewith and thereby prevents the coins from falling into the machine in an edgewise position. The periphery of the feed roller 30 is spaced from the face plate 26 a sufficient distance to permit the oriented coins to fall therebetween into a lower guide chute 36. The shaft 31 on which the roller 30 is mounted extends outwardly of the bearing 34 and has a pulley 38 secured thereto that is driven by a belt 39. Communicating with the upper guide chute 28 and positioned below the upper feed roller 30 is the lower guide chute 36 that funnels the coins toward a lower feed roller 40 that is mounted on a shaft 42. The shaft 42 is journalled in bearings 44 and 46 that are secured to the lower chute 36 and has a pulley 48 mounted on the outer end that is also driven by the belt 39. The feed roller 40 is formed of rubber material similar to that from which the roller 30 is formed, the periphery of the roller 40 being closely spaced from the surface of the face plate 26 so as to permit single-file entry of the coins therebetween. As shown in FIGS. 2 and 4, the feed roller 40 actually overlies a scavenger door 50, the purpose of the scavenger door being hereinafter described. The space defined by the periphery of the roller 42 and the face plate 18, as represented by the scavenger door 50, is that amount that is required for the largest coin that is adapted to be accepted by the machine to pass therebetween. In the machine embodied herein, a fifty-cent piece is adapted to be accepted, and therefore the space between the roller 40 and the scavenger door 50 is just greater than the thickness of a fifty-cent piece. It is seen that as the coins gravitate through the lower guide chute 36 and toward the roller 40, they will be engaged by the roller 40 and will be directed downwardly in an oriented or flat position with respect to the face plate 18 toward the coin machine rotor.

In order to drive the feed rollers 30 and 40, a motor 52 is provided and is suitably mounted on the uppermost portion of the frame 25 and just rearwardly of the fare guide assembly 27. A drive pulley 54 (FIG. 3) is mounted on a shaft 56 that is secured to a reduction drive (not shown) that in turn is driven by the motor 52. The belt 39 also engages the drive pulley 54, and rotation of the drive pulley 54 by the motor 52 will produce a corresponding rotation of the pulleys 38 and 48 and the feed rollers 30 and 40, respectively, operatively driven thereby. Since the motor 52 is independently operated with respect to the drive for the coin machine, the feed rollers 30 and 40 will be continuously rotated regardless of the operation of the coin machine.

Communicating with the coin feed channel defined by the fare guide assembly 27 is a rotor 58 in which a plurality of peripheral pockets indicated at 60 are formed. Each of the pockets 60 is adapted to receive a coin or fare part therein during intermittent movement of the rotor 58, and thus each of the pockets 60 communicates with the coin channel during the operation of the machine. In order to guide the coins or fare parts as they are directed toward the pockets 60 of the rotor 58, a feed finger assembly generally indicated at 66 is provided together with a guide member 68 that is spaced from and opposite the feed finger assembly 66. The feed finger assembly 66 and the guide member 68 are located immediately adjacent the rotor 58 in spaced relation and thus define a limited access passage through which the coins pass as they gravitate toward the pockets 60 of the rotor 58. As seen in FIG. 2, the feed finger assembly 66 includes a feed finger 70 that is pivotally mounted on the face plate 26 at 72. An upper extension 73 of the feed finger assembly extends behind the roller 40 and is secured to one end of a spring 74, the other end of the spring 74 being secured to the face plate 26 at 75. Mounted on an arm 76 that is joined to the feed finger 70 is a follower 77 that engages a cam 78, the cam 78 being secured to the shaft 42 of the feed roller 40. Thus it is seen that as the roller 40 is rotated by the belt 39, the cam 78 will also be rotated on the shaft 42. Rotation of the cam 78 will oscillate the feed finger assembly 66, and the feed finger 70 will thereby agitate the coins as they gravitate into contact therewith. The agitating or oscillating action of the feed finger 70 not only acts to break up any jams of the coins as they gravitate through the coin channel toward the rotor 58 but also tends to promote proper feeding of the coins into the pockets 60 of the rotor, and thus tends to prevent more than one coin from entering into a single pocket and causing a jam therein. Complementing the action of the feed finger 70 are a pair of hardened steel balls indicated at 80 and 82 that are disposed in the coin channel between the feed finger 70 and the guide member 68. The steel balls 80, 82 are located in appropriate openings formed in the face plate 26 and are retained therein by a plate 84 having openings for accommodating a portion of the balls therein. The upper peripheral surface of the balls 80, 82 are spaced from and underlie a cover plate indicated at 85, the cover plate being preferably formed of glass and overlying the rotor 58 and the area defining the coin channel below the feed roller 40. The balls 80, 82 thus cooperate with the glass cover plate 85 to define a restricted passage to further orient the coins prior to their entry into the peripheral pockets 60 of the rotor 58. If desired, the steel balls may be eliminated, in which case the space between the cover plate 85 and the face plate 26 would be slightly greater than the thickest coin to be accepted by the machine.

The guide member 68 is also pivotally mounted on the face plate 26 and cooperates with the feed finger 70 to guide the coins toward the pockets 60 of the rotor 58. The guide element 68 is normally retained in the coin guiding position by means of a spring 86, one end of which engages a projection 88 formed as an extension of the guide element 68. The other end of the spring 86 engages a projection 90 that is formed as part of the lower guide chute 36. Thus, it is seen that as the coins are introduced into the coin inlet 28, they will gravitate downwardly through the fare guide assembly 27, being guided by the rollers 30 and 40. Due to the spacing of the roller 40 with respect to the face plate 26, the coins will fall in parallel relation with respect to the face plate. Furthermore, as the coins gravitate toward the rotor 58, the oscillating feed finger 70 and the guide member 68 tend to promote single-file entry thereof as they fall into the pockets 60 of the rotor.

On occasion, it may be desirable to manually eject or scavenge unacceptable coins or foreign objects, such as string, sticks, paper clips, keys, etc., that have been inserted into the coin inlet. In such cases, the unacceptable coins, slugs, or other foreign articles may not reach the rotor pocket 60 due to their excessive thickness or because burrs are formed thereon or because sticky substances are adhered thereto. For the purpose of scavenging articles which stick in the coin passage, the scavenger door 50 is provided and as illustrated in FIG. 2 is positioned in the face plate 26, underlying the feed chute 36 and the feed roller 40. The scavenger door 50 has a configuration that conforms to the coin inlet passage and extends downwardly between the feed finger 70 and guide member 68. The lower end of the scavenger door 50 thus defines a configuration that generally describes the path of the coins as they gravitate toward the rotor 58. As shown in FIG. 4, the scavenger door 50 is pivotally mounted on the rear of the face plate 26 by a hinge 92 and is adapted to close an opening that is formed in the face plate 26, the opening having a configuration similar to that of the door 50. The scavenger opening communicates with a scavenger chute (not shown) into which the scavenged coins are directed when the door 50 is moved to an open position thereof, the scavenger chute in turn communicating with a main coin chute indicated at 94 in FIG. 2 and into which the acceptable coins deposited into the machine are adapted to be directed as will hereinafter be described. Pinned to the lower end of the scavenger door 50 is a stepped rod 96 that is pivotally connected between bifurcated arms, one of which is indicated at 98, the arms 98 being joined to a plunger 100 of a solenoid 102. The solenoid 102 is mounted on a bracket 103 and is normally energized to retain the scavenger door 50 in the closed position thereof, and as will hereinafter be described, a manual switch may be provided for opening the circuit to the solenoid when it is desired to open the door 50. The solenoid 102 is also responsive to a violation circuit in the computer 12 so as to open the scavenger door 50 upon two successive violations being recorded therein.

As shown in FIGS. 2 and 4, a main coin switch button 104 projects through an opening that is formed in the lowermost portion of the scavenger door 50 and is adapted to be engaged by each coin as it gravitates toward the rotor 58. The switch button 104 is operatively connected to and operates a coin switch (FIG. 11) that energizes the coin machine motor indicated at 105 and a clutch solenoid 106 (FIG. 11), the operation of which is more fully set forth in the aforesaid patent to Miller No. 2,848,158 and the copending application to Powers et al. It is sufficient to state at this point that operation of the clutch solenoid 106 and motor 105 is instituted by engagement of the coin switch button 104 by a coin that is deposited into the machine.

As described above, each of the deposited coins is guided by the feed finger 70 and the guide member 68 into one of the pockets 60 of the rotor 58. As illustrated more clearly in FIGS. 4 and 9, the rotor 58 is a thin disc overlying the face plate 26 and includes the equally spaced open pockets 60 that are formed in the periphery thereof, the pockets being separated by radial arms 107. As further stated above, the coin machine embodied herein is adapted to accept coins as high in denomination as fifty cents, and for this purpose each of the pockets 60 is formed of a width circumferentially of the rotor at least as great as the diameter of a fifty-cent piece. Since the pockets 60 are of a width substantially greater than the smallest coin to be accepted, such as a token, the contour of the pockets is formed in a specific configuration to prevent two of the smaller tokens from becoming lodged within the pockets. As shown more clearly in FIG. 10, the upper portions of each of the radial arms 107 are contoured on both edges thereof to define concave arcuate surfaces 108, the radius of which is that of a fifty-cent piece. The lower portions of each of the radial arms 107 are contoured to define a concave arcuate surface 110, the radius of which is that of the smallest token to be accepted by the coin machine, while the bottom edge 112 of each pocket 60 is of a convex arcuate curvature that is concentric with the axis of the rotor 62. By forming the pockets in the manner as described, the largest coin accepted by the machine, a fifty-cent piece represented by the letter "C," may be received within the pocket 60 for indexing to the gauging station. If two of the smaller coins accepted by the machine, such as tokens "T," are simultaneously received within a pocket 60, the concave surface 110 will assure that the uppermost token will extend sufficiently above the radial arms 107 so that it will be stripped therefrom and knocked into the next approaching pocket 60 by a coin guard assembly generally indicated at 114.

The coin guard assembly 114 as shown in FIGS. 2 and 8 includes a roller 116 that is mounted for free rotation on a stub shaft 118. The shaft 118 is mounted for rotation in a bearing 119 that is secured in one end of a lever 120. A pinion 121 is secured to the shaft 118 for rotation therewith and engages a rack 122 that is formed as part of a housing 124 in which a slot 126 is formed. The shaft 118 projects through the slot 126, the roller 116 extending outwardly of the housing 124 and projecting over the rotor 58. The lever 120 that carries the shaft 118 is positioned rearwardly of the face plate 26 and is pivotally mounted on the rear thereof at 130. The lever 120 is formed in a modified U configuration, which shape provides for vertical lifting of the roller 116 when the lever is pivoted. A spring 132 is joined to the lever 120 at 133 and acts to retain the lever in the lower position thereof, thereby locating the roller 116 at the lowermost end of slot 126 in the normal position thereof. An adjustment screw 134 extends through an enlarged section 135 of the lever 120 and engages a gauging blade 136 that is adapted to gauge the diameter of the coins indexed into contact therewith at the gauging station as will be more fully described hereinafter. As the rotor 58 indexes the coins received within the pocket 60 to the gauging station, the larger coins, such as quarters and half-dollars, that project above the radial arms 107 will engage the roller 116 and will pivot the lever 120, thereby prelifting the gauging blade 136. As will be described, the gauging blade 136 is also prelifted by a cam structure to clear the rotor radial arms 107 as the rotor 58 indexes the coins to the gauging station. Assuming that the coins are of a sufficient diameter to project above the peripheral pockets 60, the roller 116 will be lifted vertically by the coin as the rotor is indexed. However, if two coins, such as two of the smaller tokens "T" (FIG. 10), are located in the same pocket, the roller 116 will act to knock the additional coin out of the pocket into the next approaching pocket. This frees the pocket so that only one coin remains therein as it is indexed to the gauging station. In order to avoid jamming of two coins in a single pocket, it has been found that it is desirable to rotate the shaft 118 on which the roller 116 is mounted. For this purpose, the pinion 121 that is secured to the shaft 118 engages the rack 122, and as the roller 116 is lifted vertically by contact with a coin, the shaft 118 will rotate as the pinion 121 moves on the rack 122. This slight rotation of the shaft 118 produces sufficient rotary movement of the shaft to prevent the coins from jamming against the roller 116 as the rotor indexes the coins to the gauging station. This arrangement of the coin guard assembly 114 is not only designed to strip off unwanted coins, but further insures that the coins are properly seated in the rotor pockets, bouncing of the coins in the rotor pockets thereby being prevented. The coin guard 114 also preconditions the gauging blade 136 so that the larger diameter coins will be accepted at the gauging station without any jamming thereof.

Referring now to FIGS. 2 and 4, the rotor 58 and the drive therefor will be described with reference again being made to the patent to Miller No. 2,848,158 and the copending application to Powers et al. The rotor 58 has a central opening form therein which receives the forward end of a shaft 137 (FIG. 4), the forward end being splined for receiving a corresponding spline in the rotor opening. The rotor 58 is thus constrained to move with the shaft 137 upon rotation thereof. The shaft 137 is journalled in spaced bearings 138 and 139 carried by the frame structure, and a bevel gear 140 is mounted on the rearmost end of the shaft 137 rearwardly of the bearing 139. A rotor adjusting mechanism indicated at 142 is secured to the rearmost end of the shaft 138 and adjacent the bevel gear 140. The operation of the rotor adjusting mechanism 142 is essentially the same as that described in the patent to Miller No. 2,848,158, and, accordingly, the rotor and shaft may be turned to the desired position of angular adjustment as required.

The rotor 62 in the present case has twelve equally spaced pockets 60 and is adapted to be rotated one twelfth of a revolution during each cycle in the operation of the machine, coming to rest while the gauging of a coin takes place. In order to rotate the rotor 62 intermittently, a Geneva cam assembly is employed, which, as shown in FIGS. 4 and 5 herein, includes a driver assembly generally indicated at 144 that comprises a plate 146 and a locking disc 148 secured to the plate. A drive roller 150 is secured to the plate 146 and is adapted to engage a cam or star wheel as will hereinafter be described. The plate 146 and the locking disc 148 secured thereto are mounted on a shaft 152 that is journalled in suitable bearings that are carried by the frame 25. Cooperating with the locking disc 148 and engaging the drive roller 150 is a Geneva cam or star wheel 154 that has four equally spaced slots 156 formed therein and is fixed to a shaft 158 that is spaced from and parallel to the shaft 152 and that is also journalled in suitable bearings carried by the frame 25. The drive roll 150 that is secured to the plate 146 is designed to engage the successive radial slots 156 of the star wheel 154 and thereby is adapted to rotate the star wheel one quarter of a revolution for each revolution of the driver assembly 144. The circular portion of the periphery of the locking disc 148 engages the arcuate portions of the star wheel 154 intermediate the slots 156, thereby locking the star wheel 154 and the shaft 158 against rotation except when the drive roller 150 is within one of the slots 156. It is seen that the drive shaft 152 is rotated one complete revolution for each cycle of operation of the machine, the cycle defining a quarter of a revolution for the shaft 158. The means for rotating the drive shaft 152 includes the motor 105 that is operatively connected to a worm 162 through a speed reducer (not shown) and a coupling 164. The worm 162 is suitably journalled in bearings formed in spaced bosses 166 and 168 that are formed as part of the frame 25. Engaging the worm 162 is a worm gear (not shown) that is operatively connected to a clutch mechanism which as shown in Patent No. 2,848,158 is adapted to interconnect the worm gear drive to the main shaft. Although not illustrated herein, the clutch mechanism is mounted on the drive shaft 152 and is adapted to permit limited rotation of the drive shaft in response to the depositing of a coin through the coin inlet. The clutch mechanism is responsive to the operation of the solenoid 106 (FIG. 11) which is energized by the closing of a coin switch as will be described below. Secured to the end of the shaft 158 is a bevel pinion 170 that is disposed in meshing engagement with the bevel gear 140 and transfers the drive from the shaft 158 to the rotor shaft 137. The gear ratio between the bevel pinion 170 and the bevel gear 140 is 3:1 so that the total reduction from the main shaft 152 to the rotor 58 is 12:1.

The operating cycle of the coin machine is initiated by energizing the solenoid 106 that controls the operation of the aforementioned clutch mechanism. In accordance with the present invention, this automatically results from a deposit of a coin into the coin guide assembly 27, the coin gravitating downwardly through the feed rollers 30 and 40, and into engagement with the coin switch button 104. As shown in FIG. 4, the coin switch button 104 is secured to the lowermost end of a switch arm 172 that is pivotally mounted on the rear face of the scavenger door 50. The switch arm 172 controls the operation of a switch indicated at 174, the switch 174 defining the coin switch and being adapted to close a circuit to the motor 105 and to the clutch solenoid 106. A counterweight 176 normally retains the switch button 104 in the opening formed in the scavenger door 50. This causes the contact button 104 to protrude through the opening in the scavenger door 50 for engagement by a gravitating coin. When a coin strikes the coin switch button 104, it moves the switch arm 172 rearwardly, causing the switch 174 to be closed. This establishes a circuit through the motor 105 and the clutch solenoid 106 which causes the clutch mechanism to operate, whereby the main shaft 152 is rotated to produce the necessary one-fourth revolution of the Geneva cam 154.

Figure 9:
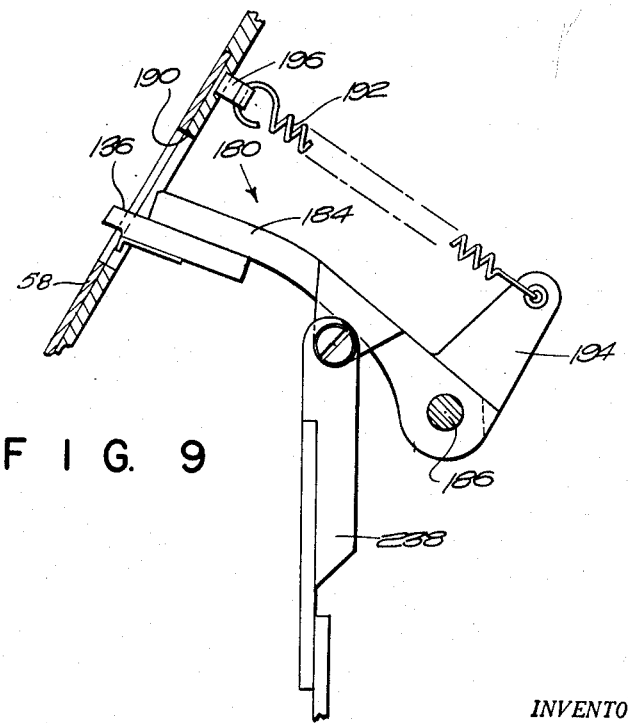
FIG. 9 is an enlarged view of a portion of the diameter gauging blade and the linkage joined thereto.

In order to determine the presence of acceptable coins and also to register a pulse for determining the amount of the coin inserted into the coin machine, a gauging mechanism is provided and is generally indicated at 180. As shown in FIG. 2, the gauging mechanism 180 is located just left of the coin guard 114 so that when a coin that is deposited within one of the pockets 60 of the rotor 58 is indexed with the rotor, it will be brought immediately after insertion into the coin inlet to a gauging station defined by the gauging mechanism. As described above, the pockets 60 of the rotor 58 are of equal size, each of a circumferential extent such that the largest coin to be registered may rest freely on the bottom of the pocket, the outer peripheral edge of the coin being exposed for engagement by the gauging blade 136. The rotor 58 is of a thickness approaching the thickness of the largest coin to be registered, and the bottom wall of each pocket 60 is arcuately curved concentric with the axis of the rotor. When a coin occupying one of the rotor pockets 60 is brought to rest at the gauging station, its outer edge projects upwardly so that it may be contacted by the gauging blade 136 that is adapted to be movable in a vertical direction and whose movement toward the axis of the rotor is limited by contact with the coin being gauged, the consequent position of the gauging blade 136 being used to identify the denomination of the coin located at the gauging station. As shown in FIG. 9, the gauging blade 136 is mounted on the underside of an arm 184 that is secured to a shaft 186, the shaft 186 being journalled for rotation in spaced parallel plates, one of which is indicated at 188 in FIG. 3. The plates 188, which are triangular in configuration, are spaced apart generally the width of the arm 184, and are mounted on the frame 25. The gauging blade 136 extends through an opening 190 formed in the face plate 26 and is formed with a concave lower surface that is adapted to engage the upper peripheral edge of the coins that are indexed to the gauging station. The gauging blade 136 is normally retained in the lower position thereof as shown in FIG. 9, and for this purpose a spring 192 is provided, one end of which is secured to an upstanding ear 194 that is formed integral with the arm 184 and the other end of which is secured to a projection 196 joined to the rear of the face plate 26. As described hereinbefore, the coin guard assembly 114 is adapted to cooperate with the gauging blade 136 as the coin is indexed to the gauging station to prelift the gauging blade 136 together with the roller 116 in response to a larger coin engaging the roller 116 as it passes thereunder.

The diameter gauging assembly 180 also includes a lever 198 (FIG. 3) that is mounted on the shaft 186 for movement therewith, the lever 198 being located on the outer surface of the adjacent plate 188. Formed on the outer end of the lever 198 is a segment 200 having a plurality of teeth formed thereon. Engaging the segment 200 is a segment pinion 202 that is secured to a stub shaft 203, the stub shaft 203 being journalled for rotation in the plate 188. Joined to the segment 202 and extending therebelow is a contact blade arm 204, the lower end of which carries a contact blade 206. A contact button 208 is mounted on the lowermost end of the contact blade 206 and is movable in an arcuate path as the segment 200 rotates the segment pinion 202 in response to the gauging blade 136 being lifted onto the periphery of a coin that has been indexed to the gauging station. A counterweight 210 is secured to the contact blade arm 204 and aids in producing a positive movement of the contact blade arm, while a spring 212 is fixed to the lever 198 and is provided for preventing backlash during movement of the contact blade arm 206.

In order to transmit the information denoted by the gauging blade 136 into electrical pulses so that the coins deposited in the coin machine may be counted for indicating a fare-paid, a selector contact assembly generally indicated at 216 is provided. The selector contact assembly 216 includes a selector contact plate 218 that has a series of contacts secured thereto in spaced relation as determined by the diameters of the coins being gauged. As shown in FIG. 3, contacts indicated at H, Q, N, D, T and R are mounted in the contact plate 218, the contacts being provided for a half-dollar, a quarter, a nickel, a dime, a token and a rest position. Although a contact for a penny is not illustrated, this contact can be provided without departing from the spirit of the invention. The tokens to be accepted may be of any desired diameter, and, accordingly, the token contact or contacts "T" will be located in accordance with the diameter of the token or tokens that are indicated for use in the machine. As indicated in FIG. 3, the contact button 208 located at the lowermost end of the contact blade 206 is positioned in engagement with the "N" contact which indicates that a nickel has been indexed to the gauging station and that the gauging blade 136 is in engagement with the upper peripheral edge of the nickel. As will be obvious, the contact button 208 will follow an arcuate path to engage one of the selector contacts, depending upon the diameter of the coin located at the gauging station.

Figure 6:
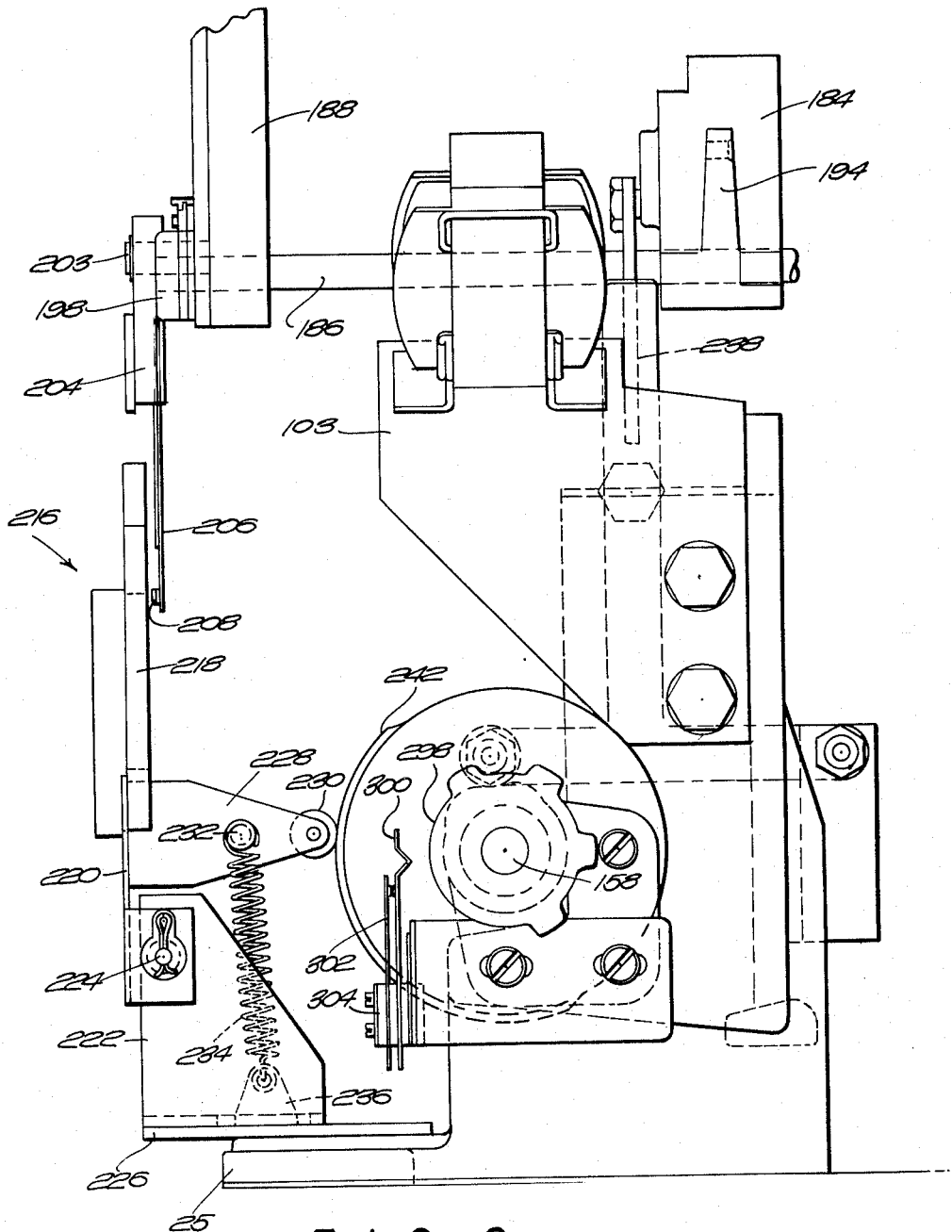
FIG. 6 is a rear elevational view of the fare collecting machine.

During the indexing of the rotor 58, the selector contact plate 218 must be moved out of contact with the contact button 208 and for this purpose is pivotally mounted with respect thereto. As shown in FIG. 6, the selector contact plate 218 is mounted on a lower plate 220 that is pivotally secured to a bracket 222 by a pin 224. The bracket 222 is mounted on a plate 226 that is in turn secured to the frame 25 of the machine. An arm 228 is secured to the plate 220 and extends inwardly thereof, a follower 230 being rotatably mounted on the innermost end thereof. Secured to a pin 232 formed on the arm 228 is a spring 234, the other end of which engages an ear 236 that is mounted on the bracket 222 intermediate the ends thereof. In the normal operation of the device, the spring 234 retains the selector contact button 208 in engagement with one of the contacts mounted on the contact plate 218.

During each gauging operation, the gauging blade 136 must be raised above the rotor arms 106 while the rotor 62 is indexed to bring a coin into the gauging station. During this indexing step, it is further necessary that the selector contact plate 218 be moved out of engagement with the contact button 208. In order to move the gauging blade 136 as indicated, a roller link assembly is provided, the operation of which is shown more clearly in the patent to Miller, No. 2,848,158. For purposes of illustration herein, it is pointed out that a link 238 illustrated in FIG. 9 is pivotally connected to the arm 184 and includes an offset linkage structure that terminates in a follower (not shown), the follower engaging a cam indicated at 240 in FIG. 4. The cam 240 is mounted on the drive shaft 152 and is rotated therewith, whereby upon rotation of the shaft 152, the cam 240 will cause the link 238 to be elevated, thereby lifting the arm 184 and moving the gauging blade 136 to the uppermost position thereof within the slot 190.

As hereinabove mentioned, when the gauging blade 136 is moved to the uppermost position, the contact blade 206 will be moved to swing the contact button 208 through an arcuate path. As mentioned above, in order to avoid wiping the contact button 208 across the selector plate contacts during this arcuate movement, the plate 218 is pivoted on the pin 224. This pivoting action is accomplished by providing a cam 242 that is mounted on the shaft 152 adjacent the cam 240. As shown in FIG. 6, the cam 242 is adapted to engage the follower 230; and upon rotation of the shaft 152, the selector plate 218 will be caused to pivot rearwardly or to the left as seen in FIG. 6 in a predetermined sequence of operation. Thus, when the cam 240 raises the gauging arm 184 and the gauging blade 136 therewith, the eccentric portion of the cam 242 will force the arm 228 to the left as seen in FIG. 6, carrying the contact plate 218 therewith, wherein the selector contact plate 218 is retracted out of engagement with the contact button 214. When the coin reaches the gauging station, the shaft 152 has rotated the cams 240 and 242 to the position whereby the retractable selector contact plate 218 is returned to its original position, the gauging blade 136 having been positioned in response to engagement therewith with the coin located at the gauging station to locate the contact button 208 in engagement with one of the selector plate contacts.

Figure 7:
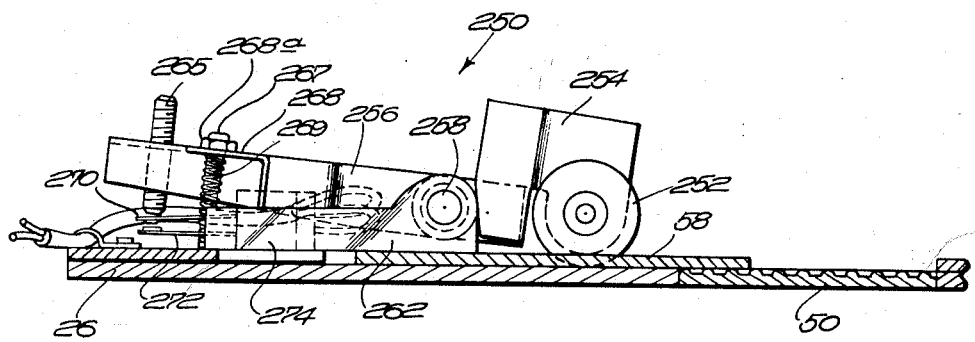
FIG. 7 is a sectional view taken along lines 7—7 in FIG. 2.

Since the coin machine embodied herein is adapted to accept large denomination coins, such as a fifty-cent piece, it is possible that on occasion two smaller coins, such as dimes, may fall into a rotor pocket in face-to-face relation. In this event, when the two dimes are indexed to the gauging station, the gauging blade 136 will not detect the presence thereof since the diameters of the dimes will be identical. For the purpose of determining the presence of two small coins such as dimes that have dropped into a single pocket, a thickness detector assembly generally indicated at 250 is provided. As shown in FIGS. 2 and 7, the thickness detector assembly 250 includes a roller 252, the axis of which is generally perpendicular with respect to the axis of the roller 116. The roller 252 overlies the rotor 58 and is adapted to engage the face of the coins that are indexed into the gauging station. The roller 252 is mounted on a bracket 254 on which a switch arm 256 is secured, the switch arm 256 being pivoted on a pin 258 that is mounted between a bracket 260 and the side wall 262 of a plate 264 that is secured to the face plate 26. The switch arm 256 is inclined with respect to the plate 264 and includes a set screw 265 that is secured to an extension 266 joined to the outer end thereof. An adjustment screw 267 extends through a bracket 268 into the bracket 262 and is engaged by a nut 268a, a spring 269 surrounding the screw 267 and abutting the underside of the bracket 268. Adjustment of the nut 268a adjusts the compression of the spring 269 and thereby controls the gap of the thickness roller 252 with respect to the face plate 26. The set screw 265 engages a contact blade 270 the contact of which is adapted to be forced into engagement with a contact secured to a contact blade 272. Both the contact blades are mounted in a contact block 274 that is secured to the plate 264. It is seen that the adjustment of the set screw 265 will control the setting of the blades 270, 272. In the operation of the thickness gauging assembly movement of the roller 252 onto the surface of a coin located at the gauging station will cause the arm 256 to pivot thereby forcing the contact blade 270 downwardly, wherein the contact located thereon will engage the contact of the contact blade 272. This completes a circuit to a double dime detector circuit which will be more fully described hereinafter. It is sufficient to state for the present that if a rotor pocket indexes two dimes to the gauging station, the thickness of the two dimes will be detected by the roller 252, thereby closing the contact blades 270, 272, and since the gauging blade 36 has determined the denomination of the dime in accordance with the diameter thereof, a circuit will be completed so as to feed four pulses to the computer 12 which then indicates that 20¢ has been indexed to the gauging station.

As the fares are inserted into the coin machine and indexed by the rotor 58, they are retained in position within a pocket 60 by a coin ring spacer 275 (FIG. 2) that is formed with an arcuate inner surface 276 that is spaced from the outer edges of the radial webs 107 of the peripheral pockets a sufficient amount to allow the largest coin to pass thereunder. The overlying cover plate 85 is usually formed of a transparent material and cooperates with the coin ring spacer 275 to form a coin channel for indexing the coins as they move toward a coin discharge opening 277. The coin discharge opening 277 is formed in the face plate 26 adjacent approximately the bottom-most end of the rotor, and as the coins are indexed thereto, they contact a knockout member 278 that is positioned within the opening 276. The knockout member 278 which is a spring leaf engages the coins as they are transferred thereto and is adapted to knock out the larger coins that may have a burr formed thereon that would tend to jam the coin in the opening 277. The coin chute 94 communicates with the discharge opening 277 and transfers the accepted coins that have been indexed by the rotor 58 to a lockbox, bag, gravity chute, vacuum removal tube, or the like. As described above, a scavenger chute communicates with the main coin chute 94 so that the articles discharged therethrough will also fall into the coin chute 94 for transfer to the lock box or other storage means.

In the operation of the coin machine of the present invention, the rotor 58 is indexed at predetermined intervals and is dependent upon reception of a coin in one of the pockets 60 formed therein. Therefore, it is necessary that the rotor 58 be operated only for a predetermined period of time. The operation of the coin machine also determines whether a barrier control means, such as the visual signal 13 or other means, will be operated. In order to properly coordinate and count the coins deposited so that a fare-paid will be recorded to operate the visual signal 13, a plurality of cams are mounted on the main shaft 152 and are adapted to actuate switches associated therewith which cause a circuit to be completed, depending upon the required operation. As shown in FIG. 3, a motor cam 282 is mounted on the shaft 152 and is adapted to actuate a motor cam switch 284. A two-lobe cam 286 is positioned adjacent the motor cam 282 and is located in series with the "D" contact on the selector plate 218. The two-lobe cam 286 operates a switch 288 to indicate the deposit of a dime fare. It is noted here that the two-lobe cam 286 is adapted to actuate switch 288 two times during each cycle of operation and thereby is adapted to impress two pulses on the electrical circuit to indicate the presence of the dime fare. This system is utilized since a single pulse is indicated as a nickel fare, and the counting chain incorporated in the computer 12 electrically connected to the switch elements uses the single pulse as a basic unit in registering the fares. A one-lobe or single-pulse cam 290 located next to the two-pulse cam 286 actuates a switch 292, while a second two-lobe cam 294 actuates a switch 296 that is connected in circuit with the "H" contact. The cam bank is completed by a four-lobe cam 298 that is adapted to actuate a switch arm 300 which carries a contact that is adapted to engage a contact secured to a switch arm 302. As seen in FIG. 6, both the switch arms 300 and 302 are mounted in a contact block 304 that is secured to the frame 25. The operation of the cams and switches will be described hereinafter with reference to the electrical circuit illustrated in FIG. 11, and it is understood that each of the cams and the switches associated therewith are provided for producing a predetermined action in the circuit, the lobes of the cams being located in preselected positions so as to produce the desired result. It is understood that additional cams and switches could be employed to produce three, four or more pulses to indicate various monetary values or tokens.

Referring now to FIG. 11, the electrical circuit for controlling the operation of the coin machine is illustrated, and as shown the computer 12 is indicated diagrammatically. The computer 12 which includes a counting chain that electrically counts the pulses determined by the coin being gauged at the gauging station forms no part of the present invention, although a counting chain embodying the general principles of the counting chain of the subject device is illustrated and described in the aforesaid copending application to Powers et al. For purposes of this description, it is pointed out that registers indicated at 310, 312 and 314 in FIG. 2 are adapted to register five- and ten-cent fares, twenty-five and fifty-cent fares and tokens, respectively. The registers 310, 312 and 314 are responsive to the computer 12 that is diagrammatically illustrated in FIG. 11 to indicate the number of fares deposited in the machine.

Assuming that a coin has been deposited in the coin machine and, in the first instance, assuming that the coin is a nickel, the coin switch 174 will be closed to energize relay R1. It is also assumed that relay R12 had already been energized by the interlock switch indicated at 316 when the cash vault (not shown) was locked within the base 15. In this connection, the interlock switch 316 may be secured within the base 15 to the uppermost wall thereof and adjacent the front of the machine. See FIG. 3. Closing of the interlock switch 316 energizes the relay R12 which, in turn, causes the normally open relay contacts R12a and R12b to close. Closing of the contact R12a causes the A.C. motor 52 to be energized, thereby continuously driving the coin guide feed rollers 30 and 40. It is thus seen that the coin guide assembly drive means is operated independently of the electrical circuit for registering the fares. Since the contact R12b is closed when the interlock switch is closed, a circuit is established to the relay R1 when the coin switch 174 is closed by a gravitating coin. When relay R1 is energized, normally open contact R1a is closed, thereby energizing relay R2. Energization of relay R2 closes relay contact R2a, thereby energizing the clutch solenoid 106. Simultaneously, the relay contacts R2b and R2c are closed to complete a circuit to the coin machine motor 105. The coin machine motor 105 will then operate, and since the clutch solenoid 106 has released the shaft 152, the rotor 58 will be rotated through the Geneva drive assembly and the bevel gearing one twelfth of a revolution. The deposited coin, which has now fallen into a pocket 60 of the rotor 58, is then indexed to the gauging station, the gauging blade 136 having been elevated by the arm 238 in response to rotation of the cam 240. Continued movement of the shaft 152 causes the arm 238 to move downwardly thereby lowering the gauging arm 184 and the gauging blade 136 therewith, so that the gauging blade 136 is lowered onto the periphery of the coin at the gauging station. Since the gauging arm 184 will be located in response to the position of the gauging blade 136, the shaft 186 will be rotated in accordance therewith. This movement is transferred through the lever 198 and segment 200 to the segment gear 203. The contact button 208 which is carried by the contact blade 206 is then positioned in accordance with the arcuate movement of the contact blade, and assuming that the coin being gauged is a nickel, the contact button 208 will engage the "N" contact. After the initial closing of the circuit through the coin switch 174, the motor cam 282 engages the motor cam switch 284, thereby closing the switch and retaining the motor relay R2 in the circuit during the gauging and registering operation. Since the coin switch 174 is only a momentary contact, it opens and will remain open until the next coin makes contact with the coin switch button 104. Thus the motor and clutch solenoid are energized only for as long as the motor cam switch 284 is closed unless another coin engages the coin switch button 104. As soon as the one-lobe cam 290 closes the one-lobe cam switch 292, a circuit is established through the nickel contact "N" which impresses a pulse on the counting chain located in the computer 12. Upon termination of the pulse when the one-lobe cam switch 292 is open, the counting chain will register the nickel and memorize this amount so that additional pulses may be utilized to aggregate a fare-paid. If it is now assumed that a dime is deposited in the machine, the contact button 208 will engage the dime contact "D," and upon closing of the one-lobe cam switch 292 the circuit will be completed to the two-lobe cam switch 288. The one-lobe cam 290 is so constructed that it will retain the one-lobe cam switch 292 closed during movement of the two-lobe cam 286 as it opens and closes the two-lobe cam switch 288 to impress two pulses on the circuit. Since the contact R3a is normally closed, two pulses will be received by the computer 12, memorized and recorded.

On the occasion that two dimes are simultaneously deposited in a rotor pocket 60, it is necessary that the two dimes be recorded as four pulses to indicate twenty cents deposited in the machine. In this event, the roller 252 of the thickness gauging assembly 250 engages the outer face of one of the dimes, and is forced outwardly by the increased thickness of the two dimes. This results in pivotal movement of the switch arm 256 and causes a circuit to be completed through the contacts carried by the blades 270 and 272, thereby energizing relay R3. The normally closed contact R3a will then open, while the normally open contact R3b will close. The four-lobe cam switch 300 is located in parallel with the two-lobe cam switch 288, and since the contact button 208 has been positioned in engagement with the "D" contact in accordance with the position of the gauging blade 136, four pulses will be impressed on the circuit to register twenty cents. If the contact button 208 engages the quarter segment in response to the movement of a quarter to the gauging station, the circuit is so arranged that if a quarter constitutes a fare-paid, impressing of a single pulse on the computer 12 will indicate the fare-paid. When the fare-paid is fifty cents and a half-dollar is deposited in the machine, the contact button 208 will engage the "H" contact and two pulses will be directed to the computer 12 to indicate the deposit of two twenty-five cent fares. The token contact may be arranged independently of the other contacts and will be connected directly to the computer 12 so that when a token is deposited in the machine, closing of the one-lobe cam switch 292 will complete a circuit through the contact "T." When the one-lobe cam switch 292 is opened to permit a pulse to be impressed on the counting system, the "T" contact which is located directly in circuit with the fare-paid relays of the counting system will immediately indicate a fare-paid. As shown in FIG. 11, the counters 310, 312, 314 are electrically connected to the computer 12 and will register the fares as they are counted.

The scavenger solenoid 102 located in the power circuit is automatically deenergized when the contact R4a is opened. This occurs upon energization of relay R4 which will be closed when manual switch indicated at 320 is closed. In this event, the scavenger solenoid 102 is deenergized to open the scavenger door 50 and thereby scavenge any coins, slugs or other articles that have been observed in the coin passage.

As shown, the switch 320 is a double-throw switch and will complete a circuit to the relay R2 when closed. Relay contacts R2a, R2b and R2c will then be closed to retain the clutch solenoid 106 and the motor 105 in the circuit. This arrangement is provided so that when the scavenger door 50 is opened the rotor 58 will continue to rotate to empty any coins deposited in the pockets thereof. The scavenger solenoid 102 may also be electrically connected to the computer 12 and responsive thereto in the event that a pulse is not received upon depositing of a coin in the coin machine. Should a jam have occurred or should the coin deposited be indicated as unacceptable by the diameter gauging assembly, then a pulse will not be impressed in the counting chain in the computer. The system may be arranged such that upon two successive passes over the treadle 14 without a valid registration, the scavenger solenoid 102 will be denergized to open the scavenger door 50.

It is understood that the barrier control means such as the visual signal 13 will be electrically connected to the computer 12 so that upon the deposit of a predetermined fare the visual signal will be actuated to permit access or entry therethrough. The barrier control means may also be in the form of a turnstile unit or some other form of barrier control that could be utilized at a toll station or access gate.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In fare collecting apparatus, a fare inlet for receiving fare parts, a rotor having pockets in which said fare parts are individually deposited as they fall through said fare inlet, means for driving said rotor, means for gauging the diameter of said fare parts for determining the denomination thereof, means for detecting the thickness of said fare parts, and means responsive to said thickness detecting means and said diameter gauging means mounted for pivotal movement for engagement with a face of said fare parts for registering said fare parts, said registering means being preconditioned to register said fare parts only if the thickness and diameter of said fare parts are in accordance with predetermined dimensions.

2. In fare collecting apparatus, a rotor having a plurality of spaced peripheral pockets for receiving fare parts therein, means for driving said rotor for moving said fare parts to a gauging station, means for gauging the diameter of said fare parts, and means located at said gauging station for detecting the presence of two fare parts of a predetermined diameter and thickness when they are deposited in a single rotor pocket in face-to-face relation, said detecting means including a movable element that is movable on contact with a face of a fare part to indicate the presence of said two fare parts.

3. In fare collecting apparatus as set forth in claim 2, said gauging means including a gauging member that is adapted to make contact with the periphery of the fare part being gauged, a selector arm operatively connected and responsive to movement of said gauging member, a selector plate having a plurality of contacts mounted thereon, each of said contacts corresponding to a fare part of specified denomination, and means located in circuit with said contacts and responsive to rotation of said rotor for producing an electrical pulse, and registering means responsive to the pulses produced to indicate the amount of the fare part being gauged.

4. In fare collecting apparatus, a rotor having a plurality of spaced peripheral pockets each of which is adapted to receive a fare part therein, means for driving said rotor and moving said fare parts to a gauging station, means for gauging the diameter of said fare parts, a detecting member located at said gauging station and adapted to engage the face of the fare parts moved thereto, means for pivotally mounting said detecting member, switch means responsive to pivotal movement of said detecting member, and means responsive to actuation of said switch means and said gauging means for registering the amount of the fare parts at said gauging station.

5. In fare collecting apparatus, means for receiving and moving fare parts to a gauging station, means for gauging the diameter of said fare parts at said gauging station, means for detecting the thickness of said fare parts at said gauging station, said thickness detecting means including a movable detecting member that is adapted to engage the face of a fare part as it moves to the gauging station, switch means operatively connected to said detecting member and actuated thereby and means responsive to the movement of said detecting member and actuation of said switch means for producing a predetermined signal when the thickness of the fare part being gauged exceeds a predetermined dimension.

6. In fare collecting apparatus, a fare inlet for receiving fare parts therein, a rotor for receiving said fare parts from said fare inlet, means for transferring said fare parts from said fare inlet to said rotor, means for driving said rotor to move said fare parts to a gauging station, means for gauging the diameter of said fare parts at said gauging station, means for detecting the thickness of said fare parts at said gauging station, said diameter engaging means including a contact blade that is pivotally movable in response to the diameter of the coin being gauged, a selector plate having a plurality of spaced contacts mounted thereon, each of said contacts having reference to a fare part and being located on said selector plate in accordance with the diameter of the associated fare part, cam means responsive to the rotation of said rotor, switch means operated by said cam means in a predetermined sequence and cooperating with said contacts to produce a pulse in accordance with the denomination of the coin being gauged, said pulse being recorded and registered to indicate the amount of the fare part deposited in said apparatus, said thickness detecting means including a pivotally mounted roller that is adapted to engage the fare part at said gauging station, and a switch responsive to said pivotally mounted roller and adapted to be actuated by said roller when the fare part being gauged exceeds a predetermined thickness, said thickness detecting means and said diameter gauging means cooperating to indicate that two fares of a predetermined thickness are simultaneously located at said gauging station, whereby said cam means and switch means cooperate to produce the corresponding number of pulses to indicate the presence of the two fare parts.

7. In fare collecting apparatus, a rotor having a plurality of spaced peripheral pockets for receiving fare parts therein, means for driving said rotor for moving said fare parts to a gauging station, means for gauging the diameter of said fare parts, means for detecting the presence of two fare parts of a predetermined diameter and thickness when they are deposited in a single rotor pocket in face-to-face relation, said detecting means including a detecting member that is adapted to be pivotally moved in response to engagement thereof with the face of one of said two fare parts that are located at said gauging station in face-to-face relation, and switch means actuated by movement of said detecting member when it is pivoted in response to engagement with one of the two face-to-face fare parts located at said gauging station, means located in circuit with said switch means for producing a series of pulses in accordance with the denomination of the two fare parts located at said gauging station, and registering means being responsive to said pulses for registering the amount of the detected fare parts.

8. In fare collecting apparatus, an inlet for receiving fare parts therein, means communicating with said inlet for transferring said fare parts to a gauging station, means for gauging the diameter of said fare parts, a detecting member located at said gauging station and adapted to engage a face of the fare parts transferred thereto, means for mounting said detecting member for relative movement, switch means responsive to movement of said detecting member, and means responsive to actuation of said switch means and said gauging means for determining the amount of the fare parts at said gauging station.

References Cited in the file of this patent

UNITED STATES PATENTS

| | | |
|---|---|---|
| 719,343 | Longerfield | Jan. 27, 1903 |
| 755,594 | Graham | Mar. 22, 1904 |
| 857,786 | Broga | June 25, 1907 |
| 2,094,029 | Thompson | Sept. 28, 1937 |
| 2,594,422 | Gordon | Apr. 29, 1952 |
| 2,729,391 | Straubel et al. | Jan. 3, 1956 |
| 2,848,158 | Miller | Aug. 19, 1958 |
| 2,881,975 | Bower | Apr. 14, 1959 |
| 2,988,191 | Grant | June 13, 1961 |

FOREIGN PATENTS

| | | |
|---|---|---|
| 183,812 | Switzerland | July 16, 1936 |
| 372,077 | Great Britain | May 5, 1932 |
| 615,105 | Great Britain | Jan. 3, 1949 |